2,785,168
Patented Mar. 12, 1957

2,785,168

ETHYL 1-METHYL-4-PHENYLISONIPECOTATE N-OXIDES

Burris D. Tiffany, Kalamazoo, Mich., assignor to The Upjohn Company, Kalamazoo, Mich., a corporation of Michigan No Drawing. Application August 16, 1955,
Serial No. 528,802

4 Claims. (Cl. 260—294.3)

This invention relates to new organic compounds and is particularly directed to ethyl 1-methyl-4-phenylisonipecotate N-oxide either as the free base or as an acid addition salt thereof.

It is an object of the invention to provide novel physiologically active compounds. It is a further object to provide novel analgesics and narcotics. It is a further object to provide novel compounds which are safe and effective for these purposes and have a higher therapeutic index than the corresponding tertiary amine.

These and other objects are accomplished in the novel compounds of the invention which are represented by the following basic formula:

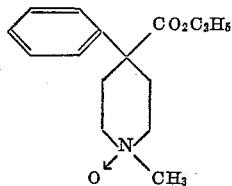

and can exist and can be used for the purposes of the invention in the form of the free base or an acid addition salt thereof with a pharamacologically acceptable acid such as hydrochloric, hydrobromic, hydriodic, sulfuric, phosphoric, nitric, acetic, benzoic, salicylic, glycolic, succinic, nicotinic, tartaric, maleic, malic, lactic acids, and the like.

The invention may be more fully understood by the following examples which are illustrative only and not to be construed as limiting.

*Example 1.—Ethyl 1-methyl-4-phenylisonipecotate N-oxide free base*

To 8.6 grams (0.035 mole) of crude ethyl 1-methyl-4-phenylisonipecotate, obtained by neutralizing the hydrochloride with concentrated ammonium hydroxide, extracting with benzene, drying and evaporating the benzene, dissolved in 200 milliliters of absolute methanol in a 500-milliliter Erlenmeyer flask was added five milliliters (about 0.055 mole) of thirty percent hydrogen peroxide and the slightly cloudy solution was kept covered at room temperature for thirteen days. The colorless solution was then treated with an aqueous slurry of 0.1 gram of active thirty percent platinum-on-carbon catalyst which caused mild gas evolution as the mixture was stirred for two hours. A filter aid was added and the mixture was filtered. The resulting clear filtrate when concentrated under nitrogen gave 9.4 grams of ethyl 1-methyl-4-phenylisonipecotate N-oxide free base as a very viscous syrup which partially crystallized upon standing.

*Example 2.—Ethyl 1-methyl-4-phenylisonipecotate N-oxide hydrobromide*

The mixture of crystals and syrup of Example 1 was dissolved in fifty milliliters of absolute ethanol and 4.5 milliliters (0.038 mole) of concentrated hydrobromic acid was added. The cooled solution yielded beautiful white needles which were collected, washed with absolute ethanol and ether, and dried for a yield of 6.4 grams of ethyl 1-methyl - 4 - phenylisonipecotate N - oxide hydrobromide, melting point 202–204 degrees centigrade with decomposition. An additional 1.3 grams, melting point 202–204 degrees centigrade with decomposition, was obtained from the filtrate for a total yield of 7.7 grams (64 percent). Recrystallization of a sample from a mixture of absolute ethanol and benzene gave fine white needles, melting point 203–204 degrees centigrade with decomposition.

*Analysis.*—Calc. for $C_{15}H_{22}BrNO_3$: C, 52.31; H, 6.44; N, 4.07. Found: C, 52.32; H, 6.06; N, 4.29.

In place of hydrobromic acid there may be substituted appropriate acids to obtain the hydrochloride, the hydroiodide, the sulfate, the phosphate, the nitrate, the acetate, the benzoate, the salicylate, the glycolate, the succinate, the nicotinate, the tartrate, the maleate, the malate, the lactate, and the like.

The novel compounds of this invention can be used for the same purposes and in the same dosage forms, such as tablets, injectables, and elixirs, as ethyl 1-methyl-4-phenylisonipecotate and the salts thereof.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. A compound selected from the class consisting of ethyl 1-methyl-4-phenylisonipecotate N-oxide free base and ethyl 1-methyl-4-phenylisonipecotate N-oxide acid addition salt of a pharmacologically acceptable acid.
2. Ethyl 1-methyl-4-phenylisonipecotate N-oxide free base.
3. Ethyl 1-methyl-4-phenylisonipecotate N-oxide acid addition salt of a pharmacologically acceptable acid.
4. Ethyl 1-methyl-4-phenylisonipecotate N-oxide hydrobromide.

No references cited.